United States Patent [19]

Mueller et al.

[11] Patent Number: 4,605,712

[45] Date of Patent: Aug. 12, 1986

[54] UNSATURATED POLYSILOXANES AND POLYMERS THEREOF

[75] Inventors: Karl F. Mueller, New York, N.Y.; Dieter Lohmann, Muenchenstein, Switzerland; Robert A. Falk, New City, N.Y.

[73] Assignee: Ciba-Geigy Corporation, Ardsley, N.Y.

[21] Appl. No.: 653,416

[22] Filed: Sep. 24, 1984

[51] Int. Cl.$^4$ ............................................. C08F 283/00
[52] U.S. Cl. ..................................... 525/474; 525/100; 525/101; 525/479; 526/279; 351/160 R; 351/160 H; 528/26; 528/28; 528/29; 528/24; 528/32
[58] Field of Search ............... 528/32, 24, 26, 28, 528/29; 526/279; 351/160 R, 160 H; 525/100, 101, 479, 474

[56] References Cited

U.S. PATENT DOCUMENTS 2,718,516  9/1955  Bortnick .
4,130,708 12/1978  Friedlander et al. .
4,136,250  1/1979  Mueller et al. .
4,233,425 11/1980  Tefertiller et al. .
4,320,221  3/1982  Hoffman .
4,486,577 12/1984  Mueller et al. ...................... 525/474

FOREIGN PATENT DOCUMENTS 1252099 11/1971  United Kingdom .
2050396 10/1980  United Kingdom .

*Primary Examiner*—Melvyn I. Marquis
*Attorney, Agent, or Firm*—Luther A. R. Hall

[57] ABSTRACT

Polysiloxanes of uniform molecular weight (MW) distribution with 500–10,000 MW segments of polysiloxane and containing at least one vinyl group connected to said polysiloxane segments through intervening alkylene-urea or -urethane linkages are prepared from polysiloxane-polyols, -polyamines or -polythiols by reaction with an unsaturated compound containing an isocyanato moiety, for example 2-isocyanatoethyl methacrylate. The polysiloxanes containing the vinyl groups are useful as radiation- or thermally curable coatings for glass, textiles, plastics, wood, ceramics, metals, as films or bandages for medicinal purposes, or molded shapes, in form of contact lenses, catheters or implants, either by themselves or in combination with other vinyl monomers; and are particularly useful in preparing hard or soft contact lenses, including hydrogel contact lenses.

40 Claims, No Drawings

UNSATURATED POLYSILOXANES AND POLYMERS THEREOF

BACKGROUND OF THE INVENTION

Polysiloxanes, especially polydimethylsiloxanes have long been used in applications where lubricity, hydrophobicity, low free-surface energy, and good low temperature flexibility, biocompatibility and/or oxygen permeability are of great concern. Aside from the specific synthesis technique for making silicone rubber, most of the general techniques of polymerization have also been used to make silicone-containing polymers and especially block-copolymers with a desirable combination of properties. These techniques include free radical polymerization of oligosiloxanylalkyl (meth)acrylates and, more commonly, synthesis of step-growth polymers like polyesters, polyurethanes or polyamides. Useful polysiloxane intermediates for this purpose are polydimethylsiloxanes of either linear or branched structure which contain two or more reactive groups, such as hydroxyl-, amino-, or thiol groups, attached by an intervening alkylene group to a Si-atom. From these intermediates vinyl terminated prepolymers have been prepared for instance by direct esterification or amidification with acryloyl- or methacryloyl chloride, acrylic- or methacrylic acid or by trans-esterification with the corresponding lower alkyl esters.

These reactions, although not difficult to carry out, are not practical when a precise end product is desired, since high conversions are difficult to achieve, requiring excess reactants as well as prolonged heating for the removal of HCl, water or alcohols. Another approach, avoiding these disadvantages involves reaction of the above mentioned polysiloxane intermediates with an equivalent amount of diisocyanate, followed by endcapping with a hydroxy- or aminoalkyl (meth)acrylate, as for instance described in U.S. Pat. No. 4,136,250, U.S. Pat. No. 4,130,708 and U.S. Pat. No. 4,486,577. Since urethane and urea formation proceeds at low temperatures and without evolution of by-products, this is a far more practical synthesis, especially where the final objective is a contact lens with uniform properties and maximal reproducibility. Further advantages of polyurethanes and polyureas over polyesters are their greater strength and flexibility and better compatibility and clarity in combination with second polymers, this being a result of inter-chain hydrogen bonding as in nylon.

However, a remaining disadvantage of the structure and synthesis described in U.S. Pat. Nos. 4,136,250, and 4,486,577, is, that due to the statistical nature of step-growth polymerization kinetics a certain amount of chain extension reactions always occurs during the reaction of the diisocyanate with the polysiloxane-diol, leading in the best case to a difficult to control or reproduce increase in viscosity and increase in poly-dispersity of the prepolymer, and in the worst case to premature gelation or at least the danger of premature gelation. Although in applications such as photo-curable coatings, small variations in polymer dispersity and functionality are of little concern, in other applications, for instance in the preparation of oxygen permeable hard and soft contact lenses precise batch-to-batch reproducibility is of utmost importance in order to meet narrow specifications of hardness, flexibility and clarity.

It has now been discovered that the above mentioned problems can be overcome and a radiation or thermally curable superior unsaturated polydimethylsiloxane be synthesized if a polydimethylsiloxane of 500–10,000 molecular weight, and containing at least two —OH, —NH or —SH groups is reacted with 2-isocyanatoethyl methacrylate (IEM), 2-isocyanoethyl acrylate, 3-isocyanatopropyl methacrylate, 1-methyl- and 1,1-dimethyl-2-isocyanatoethyl acrylate or methacrylate, of which 2-isocyanatoethyl methacrylate is preferred. Also useful in the context of the present invention are vinyl isocyanate and di(2-isocyanatoethyl) fumarate.

Reaction products of a wide variety of polyols with 2-isocyanatoethyl methacrylate have been described, for instance to be used as radiation curable coatings (U.S. Pat. No. 4,233,425), as an aerobic adhesive (U.S. Pat. No. 4,320,221) or as clear, tack-free fluorinated protective coatings (GB Pat. No. 2,050,396 B). In no instance have functional polysiloxanes been used as in the present invention.

DETAILED DESCRIPTION

The instant invention pertains to a polysiloxane containing at least one unsaturated group suitable for subsequent polymerization with one or more vinyl monomers.

The instant invention also relates to copolymers containing the polysiloxane as one component, and particularly to contact lenses comprising the crosslinked copolymerization product of said polysiloxane macromer with one or more water-soluble and/or water-insoluble monoolefinic and diolefinic monomers.

The Polysiloxane Macromer (A)

The polysiloxane macromer of this invention is a linear or branched polysiloxane macromer having a molecular weight from about 400 to about 100,000, as measured by end group analysis or gel permeation chromatography, said macromer containing at least one terminal or pendant, polymerizable olefinic group per each 5000 molecular weight unit of polysiloxane, said group being attached to the polysiloxane through one urethane, thiourethane or urea linkage, said macromer having the structure $A_1$, $A_2$, $A_3$ or $A_4$.

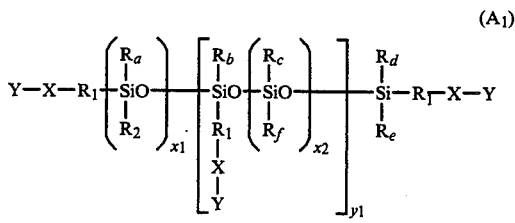
(A1)

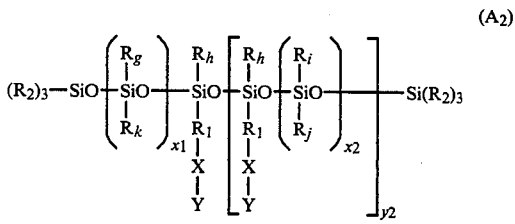
(A2)

$$Y_1-(T-R_4)_n-T-Y_1 \quad (A_3)$$
$$Y_1-(T_1-R_4)_n-T_1-Y_1 \quad (A_4)$$

wherein:

$R_1$ is a linear or branched alkylene group with 2–6 carbon atoms or a polyoxyalkylene group of structure G or $G_1$

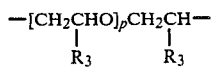 (G)

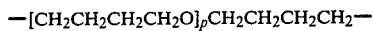 ($G_1$)

wherein $R_3$ is hydrogen or methyl and p is an integer from 1–50, $R_2$, $R_a$, $R_b$, $R_c$, $R_d$, $R_e$, $R_f$, $R_g$, $R_h$, $R_i$, $R_j$ and $R_k$ are independently methyl or phenyl, $x_1$, $x_2$, are integers from 1 to 500 with the proviso that the sum of $x_1+x_2$ is 7 to 1300, $y_1$ is 0 to 14 and $y_2$ is 1 to 13 with the proviso that the ratio of

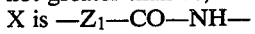

is not greater than 70,

X is $-Z_1-CO-NH-$ $Z_1$ is oxygen, sulfur or $NR_5$, wherein $R_5$ is hydrogen or lower ($C_1-C_4$) alkyl, $Z_1$ is connected to $R_1$;

$Y_1$ is

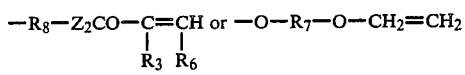

wherein:

$R_6$ is: hydrogen, methyl, $-COOR_5$ or $-COOR_7OH$, $Z_2$=oxygen or $-NR_5-$,

Y is the same as $Y_1$, or Y may also be H, alkyl of 1 to 8 carbon atoms, cyclohexyl, phenyl, o-tolyl, m-tolyl or p-tolyl, with the proviso that at least one of Y must have the same meaning as $Y_1$, $R_7$ is a linear or branched alkylene of 2 to 10 carbon atoms, phenylene or phenylalkylene with 2 to 10 carbon atoms in the alkylene, or polyoxyalkylene of structure G or $G_1$;

$R_8$ is an alkylene group of from 2 to 6 carbon atoms, $R_4$ is a diradical obtained by removing the NCO-groups from an aliphatic, cycloaliphatic, araliphatic or aromatic diisocyanate;

T is the group

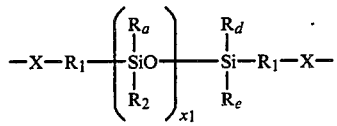

$T_1$ is the group

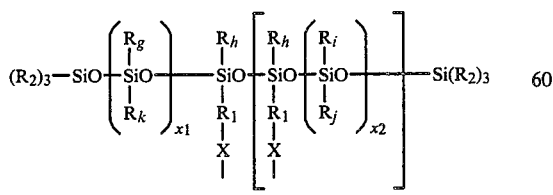

n is 0 to 10.

The compounds of structures ($A_1$) and ($A_2$) are thus polysiloxanes connected by a urethane or urea linkage to vinyl groups which may be acrylic or methacrylic, fumaric, maleic or itaconic esters or vinyl ether in nature.

The compounds of structures ($A_3$) and ($A_4$) are extended or oligomeric polysiloxanes where the original polysiloxane-polyol, -polyamine or -polythiol is first extended with a diisocyanate molecule giving group $R_4$. The resulting extended product is then reacted with a vinyl containing monoisocyanate to form the compounds of structures $A_3$ or $A_4$.

Preferred embodiments of the instant invention have $R_1$=alkylene of 3 or 4 carbon atoms, $R_2$, $R_a$, $R_b$, $R_c$, $R_d$, $R_e$, $R_f$, $R_g$, $R_h$, $R_i$, $R_j$ and $R_k$=methyl, $x_1+x_3=10$ to 100, $y_1=0$ to 2, $y_2=1$ to 3, $Z_1$=oxygen or $-NH-$, $R_4$=diradical of aliphatic or cycloaliphatic diisocyanate with 6 to 10 carbon atoms Y is the same as $Y_1$, $R_6$=hydrogen, $R_8$=$-CH_2CH_2-$;

$Z_2$=oxygen or

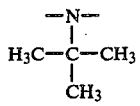

Most preferred embodiments include the Polysiloxane of structure: ($A_2$), $Z_1$, $Z_2$=oxygen, and $y_2=1$ or 2; or polysiloxanes of structures $A_3$ or $A_4$ where $R_4$=diradical of isophorone diisocyanate.

The unsaturated polysiloxane of the present invention is synthesized by reaction of a polysiloxane of general structures $L_1$ or $L_2$ with an isocyanate substituted vinyl compound. These intermediates are largely items of commerce.

Poly-functional Polysiloxanes, useful as starting materials for the macromer (A), are of structures:

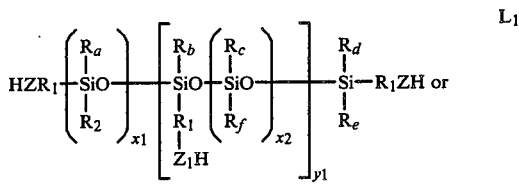

$L_1$

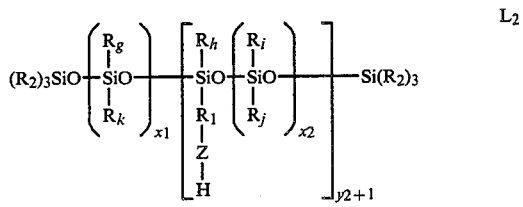

$L_2$ wherein $R_1$, $R_2$, $R_a$, $R_b$, $R_c$, $R_d$, $R_e$, $R_f$, $R_g$, $R_h$, $R_i$, $R_j$, $R_k$, $x_1$, $x_2$, $y_1$, $y_2$, and Z are defined as described above.

The isocyanato functional vinyl compound useful to react with the polysiloxanes of structure $L_1$ or $L_2$ is an NCO substituted alkyl acrylate or methacrylate of general structure

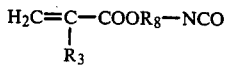

wherein

R₃ is defined as above and

R₈ is an alkylene group with 2 to 6 carbon atoms.

Examples include:

2-isocyanatoethyl methacrylate, 2-isocyanoethyl acrylate, 3-isocyanatopropyl methacrylate, 1-methyl-2-isocyanatoethyl methacrylate and 1,1-dimethyl-2-isocyanatoethyl acrylate with 2-isocyanatoethyl methacrylate being preferred. Suitable methods of preparing said isocyanato esters are well known, e.g. as shown in U.S. Pat. No. 2,718,516, and British Pat. No. 1,252,099.

The preferred monomer is 2-isocyanatoethyl methacrylate (IEM). Other monomers include isocyanato-alkyl vinyl ethers, such as 2-isocyanatobutyl vinyl ether, and esters such as bis-(2-isocyanatoethyl) fumurate and vinyl isocyanate. Also useful are monoisocyanates obtained by the reaction of 1 mol of a hydroxy or a amino functional alkyl vinyl monomer with 1 mol of diisocyanate, for instance the reaction products of 2-hydroxyethyl methacrylate, 2-hydroxyethyl acrylate, 3-hydroxypropyl methacrylate, 3-hydroxyethyl vinyl ether or t-butylaminoethyl methacrylate with isophorone diisocyanate, (3,3,4)-trimethylhexane-1,6-diisocyanate, toluene diisocyanate, diphenylmethane-4,4'-diisocyanate or the like.

If the polyfunctional polysiloxane of structure L₁ or L₂ contains more than two functional groups, it is also possible to cap one of these groups with acid chlorides, such as benzoyl chloride, or with anhydrides such as maleic, phthalic or norbornyl-anhydride, or with monoisocyanates such as butyl or phenyl isocyanate before carrying out any further polycondensation and chain extension reaction or capping with the isocyanato-substituted vinyl monomer as described below.

The reaction of the polysiloxane-polyol, -polyamine or -polythiol is carried out under conditions sufficient to cause the isocyanato group to react with the

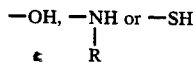

group of the polysiloxane to form an urethane, urea or thiourethane linkage. Advantageously, polyurethane formation is carried out in the presence of a catalyst, preferably an organometallic catalyst such as stannous octoate or dibutyltin dilaurate. The conditions employed in carrying out the urethane reaction involve maintaining the reaction mixture of the reactive polysiloxane and the isocyanatoalkyl ester, preferably neat, or alternatively dissolved in a non-reactive solvent such as ether, ethyl acetate, toluene or cellosolve acetate, at a temperature from ambient to 140° C. in a vessel with a reaction time from about 1 to about 24 hours. Polyurea formation from a polysiloxane-polyamine, with either primary or secondary amino groups proceeds rapidly without additional catalyst at room temperature. The amount of the isocyanatoalkyl ester can be stoichiometric or slightly in excess of the pendant functional groups of the polysiloxane. However, the amount of IEM needed is preferably less than the stoichiometric amounts, particularly if only partial capping of the polyol is desired.

At least one of the reactive groups on polysiloxanes L₁ or L₂ is reacted with the isocyanato functional unsaturated monomer and a mono, di, tri- or polyunsaturated polysiloxane is obtained with a molecular weight distribution identical to the starting polysiloxane and containing, dependent on the degree of vinyl-substitution, zero to several remaining hydroxyl, amino or thiol groups.

If all available reactive groups on L₁ or L₂ are replaced with a vinyl group, then the resulting di- or polyvinyl polysiloxanes can be used directly with or without additional vinyl monomers for free-radical polymerizations to form crosslinked polymers. If one or several of the reactive groups remain unsubstituted, the resulting mono- or polyvinyl polysiloxanes can either be used as is for free-radical polymerization, or can be used for additional reactions, such as polycondensation reactions with diisocyanates, anhydrides, diacid chlorides, diacids, diesters, epoxides, as well as chain extension reactions with diisocyanates and diamines or diols.

Chain extension reactions are easily carried out especially with polysiloxane dialkanols and diisocyanates before reaction with the isocyanato alkyl-vinyl monomer and thereby offer a way to adjust the crosslink-density of the final polymer. It is also possible to introduce additional vinyl groups by reaction of the isocyanate-functional polysiloxane-prepolymers with hydroxyalkyl (meth)acrylates or N-tert.-butylaminoethyl methacrylate, as described in U.S. Pat. No. 4,136,250.

Useful building blocks in carrying out such polycondensations include maleic anhydride, and 1,4-butanediol or 1,4-butynediol to introduce unsaturation, or polyethylene oxide-diols or -diamines to introduce hydrophilicity. Diisocyanates useful for carrying out chain extension reaction include:

ethylene diisocyanate, 1,2-diisocyanatopropane, 1,3-diisocyanatopropane, 1,6-diisocyanatohexane, 1,2-diisocyanatocyclohexane, 1,3-diisocyanatocyclohexane, 1,4-diisocyanatocyclohexane, o-diisocyanatobenzene, m-diisocyanatobenzene, p-diisocyanatobenzene, bis(4-isocyanatocyclohexyl)methane, bis(4-isocyanatocyclohexanyl)methane, bis(4-isocyanatophenyl)methane, toluene diisocyanate, 3,3-dichloro-4,4'-diisocyanatobiphenyl, tris(4-isocyanatophenyl)methane, 1,5-diisocyanatonaphthalene, hydrogenated toluene diisocyanate, 1-isocyanatomethyl-5-isocyanato-1,3,3-trimethylcyclohexane (=isophorone diisocyanate), 1,3,5-tris(6-isocyanatohexyl)biuret, 1,6-diisocyanato -2,2,4-(4,2,2)-trimethylhexane.

It is thus possible to form either linear or branched mono- or polyunsaturated polysiloxanes with molecular weights ranging from 400 to 100,000, or to form crosslinked unsaturated PDMSi-polyurethane rubbers.

The resulting polysiloxanes having pendant ethylenically unsaturated groups are generally used without further purification. If a solvent has been used in the reaction, it can be removed, or the composition containing the solvent can be employed as is.

The urethane-polysiloxane is generally a resinous (solid or semisolid) or viscous liquid material which varies in number average molecular weight ($M_n$) from about 400 to about 100,000, preferably from about 500 to about 10,000, depending on the $M_n$ of the polysiloxane used as a starting material. For purposes of this invention, $M_n$ (number average molecular weight) is determined by measuring percent active hydrogen of the starting polysiloxane while the molecular weight distribution is determined by gel permeation-chromatography.

Preferably the unsaturated polysiloxanes of the present invention are used in combination with other vinyl-monomers to make crosslinked polysiloxane-polyvinyl-block copolymers.

The great variety of monomeric reactants makes it possible to prepare either hard, highly crosslinked copolymers with suitable acrylic, methacrylic or other vinyl monomers, or to prepare soft, rubber like copolymers with low crosslink density.

It is also possible to prepare by copolymerization with hydrophilic monomers polysiloxane-hydrogels with water contents ranging up to 80%; such compositions are especially useful as highly oxygen-permeable soft contact lenses.

Reactive monomers which can be employed together with the unsaturated polysiloxane include mono- or poly-ethylenically unsaturated monomers which undergo additional polymerization upon exposure to UV-radiation or chemical initiation.

If the polyunsaturated polysiloxanes are to be used in biocompatible materials, especially in either hard or soft contact lenses, a balance of hydrophilic and hydrophobic properties is required and water-soluble as well as water-insoluble comonomers can be used.

The water-insoluble vinyl monomers ($B_1$) useful in the present invention are:

Acrylates and methacrylates of the general structure:

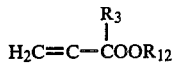

acrylamides and methacrylamides of structure:

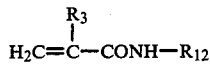

maleates and fumarates of structures:

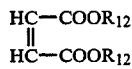

itaconates:

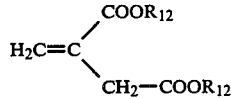

vinyl esters
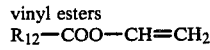

vinyl ethers
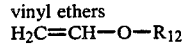

wherein $R_{12}$ is a linear or branched aliphatic, cycloaliphatic or aromatic alkyl group with from 1 to 21 carbon atoms and which may contain ether or thioether linkages or a —CO— group; $R_{12}$ may also be a heterocyclic alkyl group containing oxygen, sulfur or nitrogen atoms, or a polypropylene oxide or poly-n-butylene oxide group with from 2 to 50 repeating alkoxy units.

In addition, the $R_{12}$ group may contain halogen atoms, especially fluorine in form of perfluorinated alkyl groups with from 1–12 carbon atoms; or it may contain siloxane groups with from one to six Si atoms; and may contain —SO— and —SO$_2$— groups.

Included among the useful monomers are: methyl-; ethyl-; propyl-; isopropyl-; butyl-; isobutyl-; tert.-butyl-; ethoxyethyl-; methoxyethyl-; benzyl-; phenyl-; cyclohexyl-; trimethylcyclohexyl-; isobornyl-; dicyclopentadienyl-; norbornylmethyl-; cyclododecyl-; 1,1,3,3-tetramethylbutyl-; n-butyl-; n-octyl-; 2-ethylhexyl-; decyl-; dodecyl-; tridecyl-; octadecyl-; glycidyl-; ethylthioethyl-; furfuryl-; hexafluoroisopropyl-; 1,1,2,2-tetrahydroperfluorododecyl-; tri-, tetra- or penta-siloxanyl propyl-acrylates and methacrylates, as well as the corresponding amides; N-(1,1-dimethyl-3-oxobutyl)acrylamide; mono- and dimethyl fumarate, maleate and itaconate; diethyl fumarate; isopropyl and diisopropyl fumarate and itaconate; mono- and diphenyl and methyl phenyl fumarate and itaconate; methyl vinyl ether and methoxyethyl vinyl ether; vinyl acetate, vinyl propionate, vinyl benzoate, acrylonitrile, styrene, alpha-methyl styrene and tert-butylstyrene.

In order to achieve the high clarity necessary for contact-lens applications, it is especially useful to use comonomers or comonomer mixtures whose corresponding polymers closely match in solubility parameter ($\delta$) and/or refractive index (RI) the values of polydimethylsiloxane ($\delta = 15$; RI = 1.43). Such monomers are, for example, isobornyl methacrylate, tert.-butyl methacrylate and mixtures of hydrocarbon methacrylates (RI 1.46) with fluorine containing monomers, like hexafluoroisopropyl methacrylate; trifluoroethyl methacrylate; 1,1,2,2-tetrahydroperfluoroalkyl methacrylate or 4-thia-6-perfluoroalkyl-hexyl methacrylate, where alkyl is a carbon chain of 5–12 C atoms (RI's of 1.38–1.40) ($\delta < 15$). In addition, perfluoroalkyl groups containing monomers greatly enhance the oxygen permeability of the polymers in a synergistic manner with the polysiloxane; as such they are accordingly especially preferred comonomers.

For making hard lenses, the preferred comonomer content is 50–85% by weight of the total polymer with the preferred comonomer being methyl methacrylate, cyclohexyl methacrylate, isobornyl methacrylate, isopropyl methacrylate, isobutyl methacrylate, tert-butyl methacrylate or hexafluoroisopropyl methacrylate, styrene or mixtures thereof.

Most preferably the comonomer is methyl methacrylate, isobornyl methacrylate, isopropyl methacrylate, isobutyl methacrylate or cyclohexyl methacrylate, or mixtures thereof. Also most preferred are mixtures of methyl methacrylate and/or isobornyl methacrylate with 1 to 35% by weight of the total monomer of a short chain crosslinking agent such as neopentylene glycol diacrylate or ethylene glycol dimethacrylate or the reaction product of one mol of isophorone diisocyanate and two moles of 2-hydroxyethyl methacrylate.

Another most preferred comonomer system for preparing hard lenses is vinyl acetate/dimethyl maleate (2/1 to 5/1 molar ratios) plus a preferred methacrylate monomer listed above.

For making soft lenses, the preferred comonomer is 2-ethylhexyl acrylate, 2-ethylhexyl methacrylate, n-butyl acrylate, n-butyl methacrylate, n-octyl acrylate, n-octyl methacrylate, n-decyl acrylate, n-decyl methacrylate, perfluoroalkyl ($C_6$–$C_{10}$) substituted alkyl acrylate or methacrylate, 2-ethoxyethyl acrylate, 2-ethoxyethyl methacrylate, 2-methoxyethyl acrylate, 2-methoxyethyl methacrylate, 2-butoxyethyl acrylate, 2-butoxyethyl methacrylate, 2-(2-ethoxyethoxy)ethyl-methacrylate, 2-(2-ethoxyethoxy)ethyl methacrylate, or mixtures thereof.

The water-soluble, monomers ($B_2$) which are useful in the present invention are: acrylates and methacrylates of the general structure:

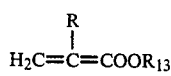

$R_{13}$ is a hydrocarbon residue of 1 to 10 carbon atoms substituted by one or more water solubilizing groups such as carboxy, hydroxy or tert.-amino, or a polyethylene oxide group with from 2–100 repeating units, or a group which contains sulfate, phosphate, sulfonate or phosphonate groups.

Acrylamides and methacrylamides of structure $$CH_2=C-CONHR_{14}$$
$$\phantom{CH_2=C-}|$$
$$\phantom{CH_2=C}R_3$$

wherein $R_{14}$ is $R_{13}$ or $R_5$;

Acrylamides and methacrylamides of structure

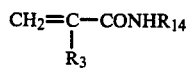

Maleates and fumarates of structure:

$$HCOOR_{13}$$
$$\|$$
$$HCOOR_{13}$$

Vinyl ethers of structure:

N-vinyl-lactams, like N-vinyl-2-pyrrolidone,

Included among the useful water soluble monomers are:

2-hydroxyethyl-; 2- and 3-hydroxypropyl-, 2,3-dihydroxypropyl-; polyethoxyethyl-; and polyethoxypropyl- acrylates and methacrylates as well as the corresponding acrylamides and methacrylamides. Sucrose-, mannose-, glucose-, sorbitolacrylates and methacrylates.

Acrylamide and methacrylamide; N-methylacrylamide and methacrylamide, bisacetone-acrylamide; 2-hydroxyethyl acrylamide; dimethyl-acrylamide and methacrylamide; methylolacrylamide and methacrylamide.

N,N-dimethyl- and N,N-diethyl-aminoethyl acrylate and methacrylate as well as the corresponding acrylamides and methacrylamides; N-tert.butylaminoethyl methacrylate and methacrylamide; 2- and 4-vinylpyridine; 4- and 2-methyl-5-vinylpyridine; N-methyl-4-vinyl piperidine; 1-vinyl- and 2-methyl-1-vinyl-imidazole; dimethylallylamine and methyldiallylamine. Para- and orthoaminostyrene; dimethylaminoethyl vinyl ether; N-vinylpyrrolidone; 2-pyrrolidinoethyl methacrylate.

Acrylic and methacrylic acid; Itaconic; cinnamic-, crotonic-, fumaric-, maleic acids and lower hydroxyalkyl mono- and diesters thereof, such as 2-hydroxyethyl- and di(2-hydroxy)ethyl fumarate,- maleate and itaconate, and 3-hydroxypropyl-butyl fumarate, and di-polyalkoxyalkyl-fumarates, maleates and itaconates.

Maleic-anhydride; sodium acrylate and methacrylate, 2-methacryloyloxyethylsulfonic acid, 2-acrylamido-2-methylpropanesulfonic acid, 2-phosphatoethyl methacrylate, vinylsulfonic acid, sodium vinylsulfonate, p-styrenesulfonic acid, sodium p-styrenesulfonate, and allylsulfonic acid.

Also included are the quaternized derivatives of cationic monomers: obtained by quaternization with selected alkylating agents like halogenated hydrocarbons such as methyl iodide, benzyl chloride or hexadecyl chloride; epoxides like glycidol, epichlorohydrin, ethylene oxide; acrylic acid, dimethyl sulfate; methyl sulfate; propane sultone.

A more complete list of water soluble monomers useful in the context of this invention is contained in:

R. H. Yocum, E. B. Nyquist, Functional Monomers; Vol. 1, p. 424–440 (M. Dekker, N.Y. 1973).

Preferred monomers are:

($B_1$)=methyl methacrylate, cyclohexyl methacrylate, isobornyl methacrylate; t-butyl and isobutyl methacrylate, isopropylmethacrylate, hexafluoroisopropyl methacrylate, 2-ethylhexyl acrylate, n-butyl acrylate, n-butyl methacrylate, n-octyl acrylate, 2-ethoxyethyl acrylate, styrene.

($B_2$)=2-hydroxyethyl methacrylate; N,N-dimethylacrylamide; acrylic and methacrylic acid; N-vinyl-2-pyrrolidone.

A wide range of divinyl compounds can be used in addition to the monovinyl compounds. Indeed, from 0 to 50% by weight of the total monomer B can be a diolefinic monomer ($B_x$). Examples of diolefinic monomers are:

Allyl acrylate and methacrylate, ethylene glycol-, diethylene glycol-, triethylene glycol-, tetraethylene glycol-, and generally polyethylene oxide glycol diacrylates and dimethacrylates; 1,4-butane diol and poly-n-butylene oxide glycol diacrylates and dimethacrylates; propylene glycol and polypropylene oxide glycol diacrylates and dimethacrylates; thiodiethylene glycol diacrylate and dimethacrylate; di(2-hydroxyethyl)sulfone diacrylate and dimethacrylate; neopentylene glycol diacrylate and dimethacrylate; trimethylolpropane tri and tetraacrylate; pentaerythritol tri and tetraacrylate; divinylbenzene; divinyl ether; divinyl sulfone; disiloxanyl-bis-3-hydroxy propyl diacrylate or methacrylate and related compounds.

Bisphenol A diacrylate or dimethacrylate, ethoxylated bisphenol A diacrylate or dimethacrylate; methylene bisacrylamide or methacrylamide, dimethylene bisacrylamide or methacrylamide; N,N'-dihydroxyethylene bisacrylamide or methacrylamide; hexamethylene bisacrylamide or methacrylamide; decamethylene bisacrylamide or methacrylamide; allyl- and dialkyl maleate, triallyl melamine, diallyl itaconate, diallyl phthalate, triallyl phosphite, polyallyl sucrose, sucrose diacrylate, glucose dimethacrylate; also, unsaturated polyesters, such as poly-(alkylene glycol maleates) and poly(alkylene-glycol fumarates), like poly(propylene glycol maleate) and poly(polyalkyleneoxide glycol maleate).

Also useful as crosslinking agents are the reaction products obtained by reacting 1 mol of di- or tri-isocyanate of structure $OCN-R_4-(NCO)_{1,2}$ wherein $R_4$ is as described above with 2 or 3 moles of a hydroxyalkyl acrylate or methacrylate, or a hydroxyalkyl vinyl ether or allyl alcohol, or N-tert.-butylaminoethyl methacrylate, or bis-hydroxyethyl maleate or any of the active-hydrogen containing compounds listed among the water soluble comonomers. If an excess of the isocyanato functional (meth-)acrylate is used in capping the polysiloxane-polyalkanol, the unreacted isocyanate can be used to react with a hydroxy- or amino functional monomers; thus the reaction products of isocyanatoethylmethacrylate with for example, hydroxyethyl methacrylate or t-butylaminoethyl methacryate are also preferred crosslinking agents.

Preferably the diolefinic monomer ($B_x$) is the acrylate or methacrylate of allyl alcohol, of a straight or branched chain alkylene glycol of 2 to 6 carbon atoms, of poly(ethylene oxide) glycol, of poly(n-butylene oxide) glycol, of poly(n-butylene oxide) glycol, of thiodiethylene glycol, of neopentylene glycol, of trimethylolpropane, or of pentaerthyritol; or the reaction product obtained by reacting one mol of a di- or tri-isocyanate of structure OCN—$R_4$—(NVO)$_v$, wherein $R_4$ is defined as above and v is 1 or 2, with 2 or 3 moles of a hydroxyalkyl acrylate or methacrylate.

A most preferred difunctional comonomer ($B_x$) is 0 to 30% by weight of the total monomer of neopentylene glycol diacrylate, the reaction-product of 1 mol isophorone diisocyanate and 2 moles of 2-hydroxyethyl methacrylate, or ethylene glycol dimethacrylate.

The monomers can be used alone, or in combination with each other with the necessary attention given to their copolymerization parameters to make sure that random copolymerization takes place. In addition, if the polymers are to be used for contact lenses, a high degree of clarity and lack of color are essential for choosing an appropriate monomer combination.

A preferred embodiment of the instant invention is a polymer where component A is a polysiloxane of structure $A_1$, $A_2$, $A_3$, $A_4$, $A_5$. $A_6$, $R_1$ is alkylene of 3 or 4 carbon atoms, $R_2$, $R_a$, $R_b$, $R_c$, $R_e$. $R_f$, $R_g$, $R_h$, $R_i$, $R_j$ and $R_k$ are each methyl, $x_1+x_2$ is 10 to 100, $y_1$ is 0 to 2, $y_2$ is 1 to 3, $Z_1$ is —O—, —S—, or —NH— and $R_4$ is a diradical of an aliphatic or cycloaliphatic diisocyanate with 6 to 10 carbon atoms, $Y_1$ or Y is

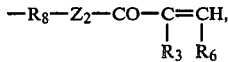

$R_8$ is ethylene, $Z_2$ is —O— or —NC(CH$_3$)$_3$—, $R_3$ is hydrogen or methyl and $R_6$ is hydrogen.

The transparent, hard and oxygen permeable polymers of this invention are produced in a final synthesis step by free radical copolymerization, either in bulk or in the presence of small amounts of solvents. The polymerization is suitably carried out with a free radical generating initiator at a temperature in the range from about 40° C. to about 105° C., the preferred temperature ranges being between about 50° C. and about 100° C. These initiators are preferably peroxides or azo catalysts having a half-life at the polymerization temperature of at least 20 minutes. Typical useful peroxy compounds include: isopropyl percarbonate, tert-butyl peroctoate, benzoyl peroxide, lauroyl peroxide, decanoyl peroxide, acetyl peroxide, succinic acid peroxide, methyl ethyl ketone peroxide, tert.-butyl peroxyacetate, propionyl peroxide, 2,4-dichlorobenzoyl peroxide, tert.-butyl peroxypivalate, pelargonyl peroxide, 2,5-dimethyl-2,5-bis(2-ethylhexanoylperoxy)hexane, p-chlorobenzoyl peroxide, tert.-butyl peroxybutyrate, tert.-butyl peroxymaleic acid, tert.-butyl-peroxyisopropyl carbonate, bis(1-hydroxycyclohexyl)peroxide; azo compounds include: 2,2-azo-bis-isobutyronitrile; 2,2'-azo-bis-(2,4-dimethylvaleronitrile); 1,1'-azo-bis (cyclohexane carbonitrile), 2,2'-azo-bis(2,4-dimethyl-4-methoxyvaleronitrile).

Other free radical generating mechanisms can be employed, such as X-rays, electron-beams and UV-radiation. Preparation of contact-lens blanks by UV radiation in the presence of a photo-initiator such as diethoxyacetophenone, 1-hydroxycyclohexyl phenylketone, 2,2-dimethoxy-2-phenylacetophenone, phenothiazine, diisopropylxanthrogendisulfide, benzoin and benzoin derivatives is a preferred method.

The amount of initiator can vary from 0.002% to 1% by weight of the monomer and macromer, but is preferably from 0.03 to 0.3% by weight thereof.

A preferred laboratory method of preparing the polymer, in the form of a cylinder, comprises the filling of flexible polymer tubing with the preferred composition of macromer, monomers, and catalyst and reacting the mixture for approximately 2 hours at 80° C. The finished article is removed by slitting the tubing longitudinally and stripping it away from the polymer article.

Another preferred method for preparing the polymer is by irridiation with ultraviolet light in the presence of a photo-initiator and using plastic molds which are UV transparent, such as molds made of polypropylene or other UV-permeable plastics.

The reaction is preferably carried out in an inert atmosphere if done in open molds. It is known that oxygen inhibits polymerization and gives rise to extended polymerization times. If closed molds are used to form the article, the molds are composed of inert materials having low oxygen permeability and non-stick properties. Examples of suitable molding materials are poly(tetrafluoroethylene), such as Teflon ®, silicone rubber, polyethylene, polypropylene and polyester, such Mylar ®. Glass and metallic molds may be used if a suitable mold-releasing agent is employed.

The instant invention also relates to a polymer, suitable for use in contact lenses, comprising the crosslinked copolymerization product of (A) from about 5 to about 75% by weight of said polymer of a linear or branched polysiloxane macromer having a molecular weight from about 400 to about 100,000, as measured by endgroup analysis or gel permeation chromatography, said macromer containing at least two terminal or pendant, polymerizable olefinic groups per each 5000 molecular weight unit of polysiloxane, said groups being attached to the polysiloxane through one urethane, thiourethane or urea linkage, said macromer having the structure $A_1$, $A_2$, $A_3$, $A_4$, (described in detail above), and (B) 95 to 25% by weight of said polymer of one or more mono-, di- or trifunctional vinyl monomer polymerizable by free radical polymerization.

More particularly, the instant invention relates to a polymer, suitable for use in contact lenses, comprising the crosslinked copolymerization product of (A) from 15 to 60% by weight of said polymer of a linear or branched polysiloxane macromer having a molecular weight from about 400 to about 100,000, as measured by endgroup analysis or gel permeation chromatography, said macromer containing at least two terminal or pendant, polymerizable olefinic groups per each 5000 molecular weight unit of polysiloxane, said groups being attached to the polysiloxane through one urethane, thiourethane or urea linkage, said macromer having the structure $A_1$, $A_2$, $A_3$ or $A_4$, (described in detail above), and (B) about 85 to 40 by weight of said polymer of water-soluble and water-insoluble monomers or water-insoluble monomers, said monomers being monoolefinic, diolefinic or a mixture of monoolefinic and diolefinic monomers, with from 0 to 100% by weight of the total monomers being water-insoluble, with 100 to 0% by weight of the total monomers being water-soluble, and 30 to 0% of the total monomers being diolefinic.

The polymers of this invention can be tailored so as to be useful either as hard contact lens material or as soft contact lens material. Different comonomers and different levels of polysiloxane macromer are required to get optimal performance in either contact lens type.

In choosing the polysiloxane component and the vinyl monomer for a hard contact lens composition, it is important to arrive at a mixture which will give clear polymers with sufficient dimensional stability and oxygen-permeability. Sometimes a mixture of comonomers is advantageous in avoiding phase-separation and thereby opacity. Also, it is easier to obtain clear products with polysiloxanes of relatively low molecular weight than with high molecular weight polysiloxanes. Polysiloxanes with a short chain length between crosslinks also give harder, more dimensionally stable polymers; however, their oxygen permeability is reduced compared to polysiloxanes with longer chain length and therefore lower crosslink density. By a judicious choice of monomer(s) and polysiloxane macromer, one is thus able to tailor to a considerable degree the physical properties and oxygen permeability of the instant silicone polymers from hard and rigid to rubbery and soft. In addition to hard and soft contact lenses, because of their good tissue compatibility and oxygen permeability and strength and elasticicity, the polymers of the present invention are also particularly suitable for use as intramusclar and subcutaneous implants in warm-blooded animals and as contact lens material. For the same reasons, the materials of the present invention may be fashioned into substituted blood vessels or extracorporeal shunts.

For preparing hard contact lenses, the preferred polymer comprises the crosslinked copolymerization product of (A) from 15 to 40% by of a polysiloxane macromer, and (B) from 85 to 60% by weight of a mixture of water-insoluble monomers ($B_1$), of water-soluble monomers ($B_2$) and of a diolefinic monomer ($B_x$), wherein, based on % by weight of the total weight of monomers, $B_1$ is from 60 to 95%, $B_2$ is from 20 to 0%, and $B_x$ is from 30 to 5%. The preferred water-insoluble monomers $B_1$ are methyl methacrylate, isopropyl methacrylate, isobutyl methacrylate, tert-butyl methacrylate, cyclohexyl methacrylate, isobornyl methacrylate or mixtures thereof. The preferred water-soluble monomers $B_2$ are 2-hydroxyethyl methacrylate, N,N-dimethylacrylamide, acrylic acid, methacrylic acid or N-vinyl-2-pyrrolidone or mixtures thereof. The preferred diolefinic monomer $B_x$ is neopentylene glycol diacrylate, ethylene glycol dimethacrylate or the reaction product of one mol of isophorone diisocyanate and two moles of 2-hydroxyethyl methacrylate.

For preparing soft contact lenses with low water absorption, the preferred polymer comprises the crosslinked copolymerization product of (A) from 40 to 60% by weight of a polysiloxane macromer, and (B) from 60 to 40% by weight of a mixture of water-insoluble monomer ($B_1$), of water-soluble monomer ($B_2$) and of a diolefinic monomer ($B_x$), wherein based on % by weight of the total weight of monomers, $B_1$ is from 70 to 100%, $B_2$ is from 30 to 0%, and $B_x$ is from 5 to 0%. The preferred water-insoluble monomers ($B_1$) are ethyl acrylate or methacrylate, n-butyl acrylate or methacrylate, n-hexyl acrylate or methacrylate, 2-ethylhexyl acrylate or methacrylate, n-octyl acrylate or methacrylate, n-decyl acrylate or methacrylate; or mixtures thereof with methyl or isobornyl methacrylate. The preferred water-soluble monomers ($B_2$) and diolefinic monomers ($B_x$) are those listed above for preparing hard contact lenses.

For preparing hydrogel contact lenses, the preferred polymer comprises the crosslinked copolymerization product of (A) from 20 to 60% by weight of a polysiloxane macromer, and (B) from 80 to 40% by weight of a mixture of water-insoluble monomer ($B_1$), of water-soluble monomer ($B_2$) and of a diolefinic monomer ($B_x$), wherein based on % by weight of the total weight of monomers, $B_1$ is from 80 to 0%, $B_2$ is from 20 to 100%, and $B_x$ is from 5 to 0%. The preferred water-soluble monomers ($B_2$) are N,N-dimethylacrylamide, N-vinyl-2-pyrrolidone, 2-hydroxyethyl methacrylate, acrylamide, or mixtures thereof. The preferred water-insoluble monomers ($B_1$) and diolefinic monomers ($B_x$) are those listed above for preparing hard or soft contact lenses.

An example of a preferred polymer for making a hard contact lens comprises (A) 30% by weight of the polysiloxane of structure $A_2$, $Z_1$ and $Z_2$ are each —O—, and $y_2$ is 2, and 70% by weight of monomer (B) wherein, based on % by weight of total monomers, $B_1$ is 71.4% of methyl methacrylate, $B_2$ is 5.7% of 2-hydroxyethyl methacryalte and $B_x$ is 22.9% of neopentylene glycol diacrylate.

An example of a preferred polymer for making a soft contact lens comprises (A) 50% by weight of the polysiloxane of structure $A_1$ where $x_1$ is 25–30, $Z_1$ and $Z_2$ are each —O—, and y, is 0, and 50% by weight of monomers (B) wherein $B_1$ is 80% of a 50/50 mixture of methyl methacrylate/2-ethylhexyl acrylate and $B_2$ is 20% of N,N-dimethylacrylamide.

An example of a preferred polymer for making a hydrogel type contact lens comprises (A) 30% by weight of the polysiloxane of structure $A_2$ where, $Z_1$ and $Z_2$ are each —O—, and $y_2$ is 2, and 70% by weight of monomers (B) wherein $B_1$ is 20% of methyl methacrylate and $B_2$ is 50% of N,N-dimethylacrylamide.

Although this invention is directed primarily toward the manufacture of contact lenses, it is within the scope of this invention to use any of the aforementioned monomers to make strong, $O_2$-permeable polymers with a wide range of physical properties, from hard and rigid to rubbery and soft and which are useful, for instance, as bandages, body implants or catheters.

The polysiloxane-copolymers of this invention may also be treated by any of the commonly used methods used to increase the wettability of hydrophobic surfaces, such as plasma-treatment and irradiation-grafting and oxidation.

The contact lenses made from the polymers of this invention are fillerless, hydrolytically stable, biologically inert, transparent and sufficiently permeable to oxygen to allow the transport of oxygen sufficient to meet the requirements of the human cornea.

The following examples are presented for the purpose of illustration only and are not to be construed to limit the nature and scope of the instant invention in any manner whatsoever.

In the following examples, specific oxygen permeability ($O_2.DK$) is determined by measuring dissolved oxygen permeability at 35° C. with a polarographic electrode in an air-saturated aqueous environment and is expressed in units $$O_2DK = \frac{cm^3(STP)x \cdot cm}{cm^2 \times sec \times cmHg} \times 10^{10}$$

Wettability is determined by measuring the contact angle of an n-octane droplet which had risen to the lower surface of a 1 mm thick sample sheet immersed in octane saturated distilled water at 36° C. In this measurement high numbers signify high wettability.

As reference materials for $O_2$-DK measurements, water swollen poly(2-hydroxyethyl methacrylate) (poly-hema; 39% water content; the most common soft-lens material) and CAB, cellulose-acetate-butyrate (an oxygen-permeable hard-lens material) are used; for wettability and hardness poly-hema and poly(methyl methacrylate) are used as reference materials. The $O_2$.DK, Shore-D and contact angle values for these materials are given below.

Hardness is determined using a Shore-D durometer on polished surfaces of center cut buttons of 10 mm diameter and 8 mm height.

| Reference Materials | $O_2$.DK | Shore-D | Octane/Water Contact Angle |
|---|---|---|---|
| poly-hema (39% H$_2$O) | 12 | — | 151 |
| poly(methyl methacrylate) | <0.1 | 92 | 92 |
| cellulose-acetate-butyrate | 8.2 | 80 | 161 |

Glossary of Abbreviations

PDMS—polydimethylsiloxane
IEM—2-isocyanatoethyl methacrylate
DBTL—dibutyltin dilaurate
HEMA—2-hydroxyethyl methacrylate
IPDI—isophorone diisocyanate
NPDA—neopentylene glycol diacrylate The following two examples show that a superior polydimethylsiloxane-trimethacrylate with the same narrow MW-distribution as the starting polysiloxane triol material is obtained in a 1-step reaction in Example 1 compared to a multi-disperse MW of the best prior-art PDMS-methacrylate obtained in a 2-step reaction as seen in Example 2.

EXAMPLE 1

Synthesis of PDMS-trimethacrylate from a PDMS-triol and IEM.

A 3-neck flask equipped with stirrer, thermometer, condenser and nitrogen inlet tube is charged with 91.5 g (0.015 m) of a tri-hydroxyalkyl functional polydimethylsiloxane (DOW CORNING fluid '1248', MW 6100) which had been stripped free of volatiles by passing it twice through a wiped-film evaporator at 120° C./0.01 mm Hg. The flask is sparged with nitrogen and 7.68 g (0.0495 m) of 2-isocyanatoethyl methacrylate (IEM) are added, followed by 0.028 g (0.028% of total) dibutyltin dilaurate (DRTL) as catalyst. The mixture is stirred at 25° C. and the disappearance of the NCO group is followed by infrared (IR) spectroscopy. After four hours only a minor amount of NCO remained and this excess isocyanate is removed by reaction to completion by adding 0.62 g (0.0047 m) 2-hydroxyethyl methacrylate (HEMA). The resulting product is a clear, colorless viscous resin. Gel permeation chromatography (GPC) shows a narrow, one-peak molecular weight (MW) distribution identical to the starting PDMS-triol, and a low MW fraction consisting of the HEMA-IEM adduct.

Schematic structure:

EXAMPLE 2

Synthesis of PDMA-trimethylacrylate from a PDMS-triol, isophorone diisocyanate and HEMA.

Following the procedure of Example 1, 91.5 g (0.015 m) of the same PDMS-triol ('1248', DOW CORNING) are stirred under nitrogen with 10.5 g (0.0473 m) 1-(isocyanatomethyl-5-isocyanato-1,3,3-trimethylcyclohexane (isophorone diisocyanate, IPDI) and 0.0125 g DBTL as catalyst. The mixture is stirred at 25° C. for 4 hours, after which time the NCO content has dropped to 1.98% (2% would be the theoretical end point). At that time 11 g HEMA are added and the mixture is stirred under nitrogen at 25° C. until all NCO has reacted, as determined by IR-spectroscopy. The resulting product is a clear, colorless viscous resin, whose GPC-scan, in contrast to the resin of Example 1, shows four peaks with four distinct MW's as a result of chain-extension, as well as a low molecular weight fraction consisting of IPDI-HEMA diadduct.

EXAMPLE 3

Synthesis of PDMS-dimethacrylate from a PDMA-triol and IEM.

Following the procedure of Example 1, a PDMS-dimethacrylate is prepared by using 123 g (0.02 m) of the '1248'-PDMS-triol and 6.206 g (0.04 m) IEM. A clear, viscous resin is obtained with the same MW distribution as the starting material PDMS. The product of Example 3 still contains ⅓ of the original hydroxy groups.

It is obvious that a similar material cannot be prepared by the methods of prior-art, using a diisocyanate and HEMA.

Schematic structure:

EXAMPLE 4

Synthesis of PDMA-dimethacrylate from a partially capped PDMS-triol and IEM.

Following the procedure of Example 1, 100 g (0.0143 m) of tri-hydroxyalkyl functional poly-dimethylsiloxane (DOW CORNING fluid '1248'; MW 6986) are reacted with 1.42 g (0.0143 m) of n-butylisocyanate using 0.025% dibutyltin dilaurante as catalyst at 25° C. for 4 hours. The resulting product is a PDMS with, on the average, 2 hydroxyl groups per molecule.

3.33 g (0.0048 m) of this PDMS-diol described above are reacted with 1.55 g (0.0101 m) of 2-isocyanatoethyl methacrylate to cap the remaining hydroxy-groups. The disappearance of isocyanate functionality is followed by infrared spectroscopy.

A clear, viscous resin is obtained with a molecular weight distribution identical to the resins of Examples 1 and 3 and of the starting material PDMS.

Schematic structure:

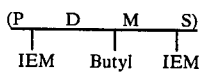

EXAMPLE 5

Synthesis of chain-extended polysiloxane-polymethacrylates from partially blocked PDMS-triols.

Following the procedure of Example 1, 123 g (0.02 m, MW=6150) tri-hydroxy alkyl-polydimethylsiloxane (DOW CORNING Fluid '1248') are reacted with 3.103 g (0.02 m) 2-isocyanatoethyl methacrylate.

24.8 g (0.004 m) of this mono-IEM substituted PDMS are reacted with 0.467 g (0.002 m+5% excess) isophorone diisocyanate; the disappearance of the NCO-functionality is followed by IR-spectroscopy. The remaining hydroxy groups are then reacted with 0.62 g (0.004 m) IEM. The resulting clear, viscous resin has a much higher MW than the resin of Example 1, as determined by gel permeation chromatography.

Schematic structure:

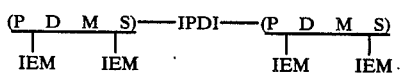

The following examples were carried out in order to create a higher MW PDMS methacrylate for synthesis of a less crosslinked and softer contact lens material.

EXAMPLES 6-14

Attempts to control chain-extension of PDMS-triol by reaction with different amounts of diisocyanate.

Following the procedure of Example 2, the PDMS-triol '1248' and isophorone-diisocyanate (IPDI) are reacted in the following amounts and ratios.

| Ex. | g/g | PDMS-triol '1248'/IPDI mol/mol | eqv./eqv. | Product |
|---|---|---|---|---|
| 6 | 61 | 1 0.5 | 3/1.0 | all |
| 7 | 61 | 1 0.75 | 2/1.0 | materials |
| 8 | 61 | 1 0.875 | 1.7/1.0 | crosslinked |
| 9 | 30.5 | 1 1.00 | 1.5/1.0 | |
| 10 | 30.5 | 1 1.33 | 1.13/1.0 | |
| 11 | 30.5 | 1 1.5 | 1.0/1.0 | |
| 12 | 30.5 | 1 2 | 1.33/1 | |
| 13 | 30.5 | 1 2.5 | 2/1 | |
| 14 | 30.5 | 1 3.0 | 2.5/1.0 | clear, very viscous resin |

Only Example 14 results in a PDMS-isocyanate intermediate which can be used for further synthesis of methacrylate capped PDMS by reaction with 2-hydroxyethyl methacrylate. The methacrylate capped PDMS-macromer is extremely viscous, and when analyzed by GPC, is seen to consist of at least 4 different MW-fractions, compared to the uniform MW distribution of the macromer of Example 1.

EXAMPLE 15

Synthesis of PDMS-dimethacrylates from PDMS-diols and IEM.

21.94 g (0.005 m) of a poly-dimethylsiloxane-dialkanol (Shin-Etsu X-61-504A; MW=4388) are reacted with 0.555 g (0.0025 m) of isophorone diisocyanate (IPDI) at 25° C. for 6 hours using 0.009 g dibutyltin dilaurate as catalyst. The residual hydroxy-groups are capped in a second step by reaction with 0.776 g (0.005 m) of 2-isocyanatoethyl methacrylate for 5 hours. The modified polysiloxane macromer so obtained with terminal methacrylate groups is a clear and viscous resin of approximately 9000 MW.

Schematic structure:

EXAMPLE 16

Using the same procedure as in Example 15, a more chain-extended PDMS-dimethacrylate is prepared from 21.94 g (0.005 m) PDMS-diol (Shin Etsu X61-504A), 0.860 g (0.00375 m) IPDI and 0.387 g (0.0025 m) IEM. The resulting resin is colorless and very viscous with a MW of about 18500.

Schematic structure:

EXAMPLE 17

Using the same procedure as in Example 15, a polydimethylsiloxane dimethacrylate is prepared by reacting 12.19 g (0.005 m) of a PDMS-dialkanol (Shin-Etsu X-61-504A 1000, MW=2438) with 1.552 g (0.01 m) 2-isocyanatoethyl methacrylate in presence of 0.01 g dibutyltin dilaurate. A clear, slightly viscous resin is obtained with a MW of 2749.

Schematic structure:

EXAMPLE 18

Using the same procedure as in Example 15, a polydimethylsiloxane dimethacrylate is prepared by reacting 24.59 g (0.005 m) of a PDMS-dialkanol (Shin-Etsu X-61-504A 2000, MW=4918) with 1.552 g (0.01 m) 2-isocyanatoethyl methacrylate in presence of 0.01 g dibutyltin dilaurate. A clear, slightly viscous resin is obtained with a MW of 5228.

Schematic structure:

EXAMPLE 19

Synthesis of PDMS-dimethacrylate from PDMS-diamine and IEM.

21.9 g (0.01 m) of a bis-3-aminopropyl-terminated polydimethylsiloxane (MW 2190, Petrarch Systems, Inc. PS-510) are reacted with 3.1 g (0.02 m+5% excess) of 2-isocyanatoethyl methacrylate dissolved in 6 g of water-free diethyl ether. The temperature of the mixture is kept at 25° C. and stirring continued for 3 hours. The disappearance of OCN-groups is followed by IR-spectroscopy. The solvent is evaporated at 50° C./0.02 Torr using a rotovaporator. A clear, viscous resin is obtained with a MW of about 2500.

Schematic structure:

EXAMPLE 20

Following the same procedure as in Example 15, a chain extended poly-urea PDMS is prepared from 21.9 g (0.01 m) bis-3-aminopropyl terminated PDMS by first reacting it with 1.48 g (0.0067 m) IPDI in 10 ml diethyl ether and than capping the residual NH2-groups with 1.08 g (0.0067 m+5% excess) IEM. A clear viscous resin is obtained, with a MW of about 8000.

Schematic structure:

EXAMPLE 21

Synthesis of PDMS-dimethacrylate from PDMS-dithiols and IEM.

27.3 g (0.01 m) of a polydimethyl siloxane dialkylene-thiol (DOW CORNING Fluid x 2-8024, MW 2730) are reacted with 3.1 g (0.022 m) of 2-isocyanatoethyl methacrylate at 25° C. for 4 hours using 0.066% triethylamine as catalyst. The excess isocyanate is capped with tert.-butylaminoethyl methacrylate (0.002 m). The disappearance of the isocyanate functionality is followed by infrared spectroscopy. A clear, viscous resin is obtained, which consists of a PDMS-dimethacrylate of a MW of about 3100 and a minor amount of the reaction product of IEM with t-butylaminoethyl methacrylate.

Schematic structure:

EXAMPLES 22-27

Synthesis of materials suitable for hard contact lenses.

30 g of the tri-methacrylate-PDMS synthesized in Example 1 is mixed with 4 g HEMA, 16 g neopentyleneglycol diacrylate (NPDA) and 50 g methyl methacrylate. 0.2 g 1-hydroxycyclohexyl phenyl ketone, IRGACURE-184 are added and the mixture stirred until clear. After thrice degassing in vacuo and blanketing with nitrogen, the mixture is polymerized by UV-irradiation in form of contact-lens blanks (round buttons, 13 mm diameter, 9 mm high), within a polypropylene mold for hardness measurements and machinability studies and in form of 0.1 mm thick films between Mylar lined glass plates for measuring oxygen permeability.

Using the same procedure, monomer mixtures with the compositions listed below are prepared and polymerized; clear and hard polymers are obtained with the following physical properties. All polymers can be cut and polished into hard to semi-hard contact lenses with excellent oxygen permeability.

| Ex. No. | Comp. From Example | PDMS-IEM Adduct L[1] | MW | % | Comonomer[2] % MMA | IBMA | NPDA | GMA | HEMA | Shore D Hardness | O2.DK 34° C. |
|---|---|---|---|---|---|---|---|---|---|---|---|
| 22 | 1 | 3 | 6500 | 30 | 50 | — | 16 | — | 4 | 76 | |
| 23 | 1 | 3 | 6500 | 30 | — | 54 | 16 | — | 4 | 78 | 33 |
| 24 | 1 | 3 | 6500 | 30 | — | 50 | 16 | 4 | 4 | 78 | 30 |
| 25 | 4 | 2 | 6500 | 30 | 50 | — | 16 | — | 4 | 63 | 35 |
| 26 | 17 | 2 | 3000 | 30 | 50 | — | 16 | — | 4 | 78 | 17 |
| 27 | 17 | 2 | 2749 | 25 | 55 | — | 16 | — | 4 | 80 | 25 |

[1]L = Theoretical functionality
[2]MMA: methyl methacrylate
IBMA: isobornyl methacrylate
NPDA: neopentyl glycol diacrylate
GMA: glycidyl methacrylate
HEMA: 2-hydroxyethyl methacrylate

EXAMPLES 28-34

Synthesis of materials suitable for soft, hydrophobic (silicone-rubber type) contact lenses.

Using the same procedure as in Example 22, PDMS-methacrylate macromers are mixed with comonomers and IRGACURE-184 and polymerized as described. The composition and the physical properties of the materials are shown in the following table.

| Ex. No. | PDMS-IEM of Example | L[3] | 6500 | % | Comonomers[1] | | | | Shore-A Hardness | Tensile Strength kg/mm² × 10² | Elongation % | Bending[2] Angle ° | O2.DK × 10¹⁰ |
|---|---|---|---|---|---|---|---|---|---|---|---|---|---|
| 28 | 1 | 3 | 6500 | 50 | EHA | 30 | GMA | 20 | 60 | 7.35 | 45.3 | 36 | — |
| 29 | " | " | " | 40 | " | 40 | " | 20 | 51 | 3.66 | 43.6 | 40 | 74.8 |
| 30 | 5 | 4 | 13000 | 50 | BEHA | 40 | GMA | 40 | 48 | 5.45 | 55 | 42 | |
| 31 | " | " | " | 50 | EHA | 30 | " | 20 | 56 | 9.24 | 72.7 | 38 | — |
| 32 | " | " | " | 50 | SiMA | 50 | | | 47 | 12.8 | 127.8 | 62 | 97.5 |
| 33 | 13 | 2 | 9000 | 50 | EEHA | 50 | | | 39 | 3.09 | — | 56 | 62.8 |
| 34 | 18 | 2 | 5228 | 50 | GMA | 30 | GMA | 20 | 48 | 9.04 | 92.3 | 33 | 63.0 |

[1]EHA: 2-ethylhexyl acrylate
GMA: glycidyl methacrylate
BEHA: 2-butoxyethyl acrylate
EEHA: 2-ethoxyethyl acrylate
SiMA: 3-methacrylpropyl pentamethyl disiloxane

[2]The bending angle is a measure of the 'softness' of the polymer. It is obtained by cutting a 2½ × ½ inch (6.35 × 1.27 cm) sample of a 1 mm thick sheet, clamping ½ inch (1.27 cm) of its length horizontally between two glass plates and measuring the angle with the horizontal formed by the line from end of the support to the end of the overhanging sample.

[3]L = theoretical functionality

EXAMPLES 35-36

Synthesis of polymers suitable for soft contact lenses from PDMS-methacrylates derived from PDMS-dialkanols.

Following the general procedure of Example 22, 60 g PDMS-methacrylates from Examples 15 and 16 are mixed respectively with 40 g 2-ethylhexyl acrylate, 0.2% IRGACURE-184 and polymerized by UV-light to give buttons, sheets and films of high optical clarity.

The following table contains the physical properties of the copolymers prepared. The improved properties show the usefulness of those types of functional siloxanes for the synthesis of water free, soft contact lens materials, comparing favorably with water-swollen poly-hydroxyethyl methacrylate.

|  | Example 35 | Example 36 | Poly-HEMA[1] Control Polymer |
|---|---|---|---|
| Shore-A hardness | 53 | 46 | 31 |
| Tensile Strength kg/mm$^2$ | 0.0396 | 0.0662 | 0.0227 |
| Youngs' modulus Kg/mm$^2$ | 0.229 | 0.0923 | 0.0510 |
| Elongation to break, % | 22.6 | 151 | 89 |
| Bending angle[2] | 30° | 60° | 66° |
| O$_2$DK ($\times 10^{10}$) | 38.2 | 42.2 | 24.7 |

[1]The used poly-HEMA was copolymer of 99.45% 2-hydroxyethyl methacrylate, 0.25% ethyleneglycol dimethyacrylate and 0.3% methacrylic acid, tested in the swollen state (38.5% water).
[2]The bending angle is a measure of the 'softness' of the polymer. It was obtained by cutting a 2½ × ½ inch (6.35 × 1.27 cm) sample of a 1 mm thick sheet, clamping ½ inch (1.27 cm) of its length horizontally between two glass plates and measuring the angle with the horizontal formed by the line from end of the support to the end of the overhanging sample.

The following examples show the usefulness of the novel PDMS-methacrylate for the synthesis of silicone containing hydrogels.

EXAMPLES 37-40

30 g of the PDMS-macromer of Example 1 are mixed with methyl methacrylate (MMA) and dimethylacrylamide (DMA) in proportions as shown in the table. To each solution 0.2 g IRGACURE-184 is added and the mixture is degassed in vacuo and kept under nitrogen. Each mixture is cast and polymerized by UV in form of 1 mm thick sheets. 0.1 mm thick sheets, 0.11 thick films and round buttons of 13 mm diameter and 9 mm height, as described in Example 22. All samples are completely clear. For each material, dry hardness, equilibrium water content, tensile strength (wet state) and O$_2$-permeability (wet state) are determined, as shown in the table.

| Ex. | Composition % | | | Hardness Shore-D Dry | % H$_2$O | Tensile Strength (kg/mm$^2$) | Elongation % | O$_2$.DK × 10$^{10}$ |
|---|---|---|---|---|---|---|---|---|
|  | PDMS-IEM | MMA | DMA |  |  |  |  |  |
| 37 | 30 | 20 | 50 | 82 | 51.8 | 0.147 | 63 | 64.4 |
| 38 | 30 | 30 | 40 | 79 | 37 | 0.947 | 49 | 56.5 |
| 39 | 30 | 40 | 30 | 78 | 22 | 2.43 | 49 | 40.3 |
| 40 | 30 | 50 | 20 | 80 | 11 | 3.00 | 28 | 39.3 |

EXAMPLES 41-42

Comparison of IEM and IPDI/HEMA- Capped Macromers

The instant polysiloxane macromers contain the group X which is —$Z_1$—CO—NH— whereas in the polysiloxane macromers of U.S. Pat. Nos. 4,136,250; 4,130,708 and 4,486,577, X is the linking group —$Z_1$—CO—NH—$R_4$—NHCO—.

To demonstrate that the absence of the —$R_4$—NHCO— portion of the group X in the instant macromers does make a difference, an instant polysiloxane macromer is prepared wherein a polysiloxane diol of equivalent weight 1219 (molecular weight 2438) is capped with two equivalents of 2-isocyanatoethyl methacrylate (IEM) according to the instant invention following the general procedure of Examples 1 and 17.

The closest prior art polysiloxane macromer is prepared wherein the same polysiloxane diol is capped first with two equivalents of isophorone diisocyanate (IPDI) followed by reaction with two equivalents of 2-hydroxyethyl methacrylate (HEMA) following the general procedure of Example 2.

Each polysiloxane macromer is copolymerized according to the general procedure of Examples 22-27 to prepare polymers for use in hard contact lenses.

The polymers are prepared from the following monomers (all percents are in % by weight of the final polymer):
polysiloxane macromer: 25
methyl methacrylate: 55
neopentylene glycol acrylate: 16
2-hydroxyethyl methacrylate: 4

The physical properties of the polymers made are given in the table below.

TABLE

Comparison of IEM and IPDI/HEMA-Capped Macromers

| Macromer and Polymer According to Example* | Capping Method | Appear. | Swelling % H$_2$O/Eth. | % Si in Macromer | % Si in Polymer | Shore-D Hardness | O$_2$.DK (× 10$^{10}$) |
|---|---|---|---|---|---|---|---|
| 41 | IEM | clear | 2.42/28.07 | 33.5 | 8.38 | 79 | 8.1 |
| 42 | IPDI/HEMA | clear | 2.60/21.45 | 29.3 | 7.33 | 81 | 5.7 |

*The polysiloxane macromer in Example 41 is prepared according to the instant invention. The polysiloxane macromer in Example 42 is prepared according to the prior art.

The instant polysiloxane macromer at the same polymer composition provides a higher silicon content in the final polymer along with perceptibly higher oxygen permeability so important in the field of contact lenses.

EXAMPLE 43

Macromer Properties

The dispersity, average molecular weight, number of peaks observed by gel permeation chromatography (GPC) and viscosity of polysiloxane macromers prepared according to Examples 1 and 2 are compared to show that there are major differences in these properties depending on whether the polysiloxane macromer is made according to the instant invention (as in Example 1) or according to the prior art (as in Example 2).

| Polysiloxane Macromer according to Example | Dispersity* | Average Molecular Weight | GPC peaks | Viscosity |
|---|---|---|---|---|
| 1 | 6 | $1.4 \times 10^4$ | 1 | low |
| 2 | 29 | $8.9 \times 10^4$ | 4 | high |
| starting siloxane triol ('1248') | 2.2 | $1.4 \times 10^4$ | 1 | low |

*Dispersity is ratio of weight average molecular weight to number average molecular weight. A broader molecular weight distribution correlates with a higher dispersity value.

The instant polysiloxane macromer has a narrow molecular weight distribution, gives only one peak in the GPC and is of low viscosity. The prior art polysiloxane macromer has a much broader molecular weight distribution, a number of peaks in the GPC and is of high viscosity.

The instant polysiloxane macromer represents a more reproducible product of more closely defined structure with all the concomitant benefits accruing to such products when the narrow product specifications and product reproducibility are paramount.

What is claimed is:

1. A linear or branched polysiloxane macromer having a molecular weight from about 400 to 100,000, as measured by end group analysis or gel permeation chromatography, said macromer containing at least one terminal or pendant, polymerizable olefinic group per each 5000 molecular weight unit of polysiloxane, said group being attached to the polysiloxane through one urethane, thiourethane or urea linkage, said macromer having the structure $A_1$, $A_2$, $A_3$ or $A_4$

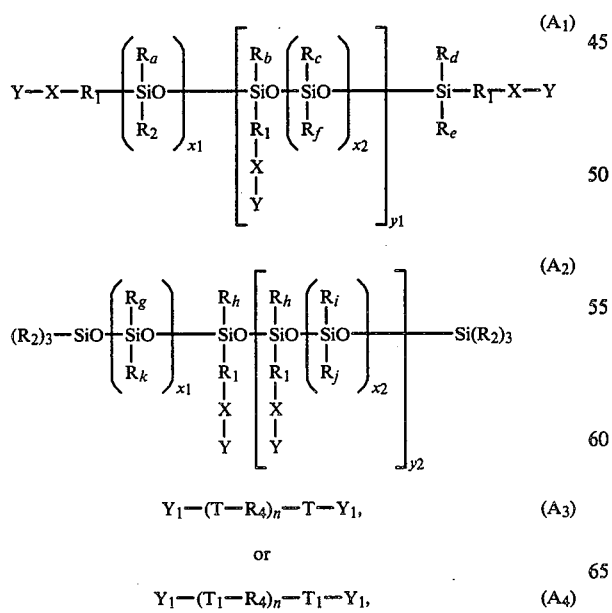

$$Y_1-(T-R_4)_n-T-Y_1, \quad (A_3)$$

or $$Y_1-(T_1-R_4)_n-T_1-Y_1, \quad (A_4)$$

wherein:

$R_1$ is a linear or branched alkylene group with 2-6 carbon atoms or a polyoxyalkylene group of structure G or $G_1$

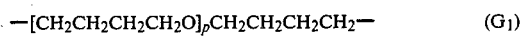

wherein $R_3$ is hydrogen or methyl and p is an integer from 1–50, $R_2$, $R_a$, $R_b$, $R_c$, $R_d$, $R_e$, $R_f$, $R_g$, $R_h$, $R_i$, $R_j$ and $R_k$ are independently methyl or phenyl, $x_1$, $x_2$ are integers from 1 to 500 with the proviso that the sum of $x_1+x_2$ is 7 to 1300, $y_1$ is 0 to 14 and $y_2$ is 1 to 13 with the proviso that the ratio of $$\frac{x_1+x_2}{y_1+2} \text{ or } \frac{x_1+x_2}{y_2+1}$$

is not greater than 70,

X is $-Z_1-CO-NH-$ $Z_1$ is oxygen, sulfur or $NR_5$, wherein $R_5$ is hydrogen or lower ($C_1-C_4$) alkyl, $Z_1$ is connected to $R_1$;

$Y_1$ is

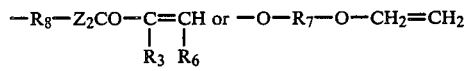

wherein:

$R_6$ is: hydrogen, methyl, $-COOR_5$ or $-COOR_7OH$, $Z_2$=oxygen or $-NR_5-$

Y is the same as $Y_1$, or Y may also be H, alkyl of 1 to 8 carbon atoms, cyclohexyl, phenyl, o-tolyl, m-tolyl or p-tolyl, with the proviso that at least one of Y must have the same meaning as $Y_1$, $R_7$ is a linear or branched alkylene of 2 to 10 carbon atoms, phenylene or phenylalkylene with 2 to 10 carbon atoms in the alkylene, or polyoxyalkylene of structure G or $G_1$;

$R_8$ is an alkylene group of from 2 to 6 carbon atoms, $R_4$ is a diradical obtained by removing the NCO-groups from an aliphatic, cycloaliphatic, araliphatic or aromatic diisocyanate;

T is the group

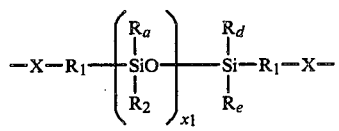

$T_1$ is the group

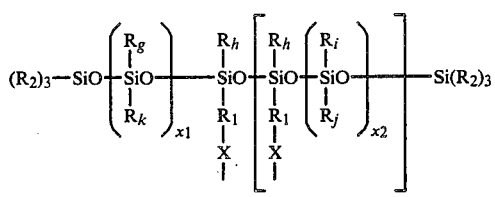

n is 0 to 10.

2. A polysiloxane macromer according to claim 1 wherein $R_1$ is alkylene of 3 or 4 carbon atoms, $R_2$, $R_a$, $R_b$, $R_c$, $R_d$, $R_e$, $R_f$, $R_g$, $R_h$, $R_i$, $R_j$ and $R_k$ are each methyl, $x_1+x_2$ is 10 to 100, $y_1$ is 0 to 2, $y_2$ is 1 to 3, $Z_1$ is —O— or —NH— and $R_4$ is a diradical of an aliphatic or cycloaliphatic diisocyanate with 6 to 10 carbon atoms, and Y is the same as $Y_1$, $R_6$ is hydrogen, $R_8$ is ethylene, and $Z_2$ is —O— or —NC(CH$_3$)$_3$—.

3. A polysiloxane macromer according to claim 2 where the polysiloxane is of structure $A_2$, $Z_1$ and $Z_2$ are each —O—, and $y_2$ is 1 or 2.

4. A polysiloxane macromer according to claim 1 wherein the polysiloxane is of structure $A_3$ or $A_4$, where $R_4$ is the diradical derived from isophorone diisocyanate.

5. A polymer, suitable for use in contact lenses, comprising the crosslinked copolymerization product of (A) from 5 to 75% by weight of said polymer of a linear or branched polysiloxane macromer having a molecular weight from about 400 to about 100,000, as measured by end group analysis or gel permeation chromatography, said macromer containing at least two terminal or pendant, polymerizable olefinic groups per each 5000 molecular weight unit of polysiloxane, said groups being attached to the polysiloxane, said groups being attached to the polysiloxane through one urethane, thiourethane or urea linkage, said macromer having the structure $A_1$, $A_2$, $A_3$ or $A_4$, $$Y-X-R_1-\left(\underset{R_2}{\overset{R_a}{\underset{|}{\overset{|}{Si}O}}}\right)_{x1}\left[\underset{\underset{\underset{Y}{|}}{\underset{X}{|}}{R_1}}{\overset{R_b}{\underset{|}{\overset{|}{Si}O}}}\left(\underset{R_f}{\overset{R_c}{\underset{|}{\overset{|}{Si}O}}}\right)_{x2}\right]_{y1}\underset{R_e}{\overset{R_d}{\underset{|}{\overset{|}{Si}}}}-R_1-X-Y \quad (A_1)$$

$$(R_2)_3-SiO\left(\underset{R_k}{\overset{R_g}{\underset{|}{\overset{|}{Si}O}}}\right)_{x1}\left[\underset{\underset{\underset{Y}{|}}{\underset{X}{|}}{R_1}}{\overset{R_h}{\underset{|}{\overset{|}{Si}O}}}\underset{\underset{\underset{Y}{|}}{\underset{X}{|}}{R_1}}{\overset{R_h}{\underset{|}{\overset{|}{Si}O}}}\left(\underset{R_j}{\overset{R_i}{\underset{|}{\overset{|}{Si}O}}}\right)_{x2}\right]_{y2}Si(R_2)_3 \quad (A_2)$$

$$Y_1-(T-R_4)_n-T-Y_1 \text{ or} \quad (A_3)$$
$$Y_1-(T_1-R_4)_n-T_1-Y_1 \quad (A_4)$$

wherein:

$R_1$ is a linear or branched alkylene group with 2–6 carbon atoms or a polyoxyalkylene group of structure G or $G_1$ $$-[CH_2\underset{R_3}{\overset{|}{CHO}}]_pCH_2\underset{R_3}{\overset{|}{CH}}- \quad (G)$$

$$-[CH_2CH_2CH_2CH_2O]_pCH_2CH_2CH_2CH_2- \quad (G_1)$$

wherein $R_3$ is hydrogen or methyl and p is an integer from 1–50, $R_2$, $R_a$, $R_b$, $R_c$, $R_d$, $R_e$, $R_f$, $R_g$, $R_h$, $R_i$, $R_j$ and $R_k$ are independently methyl or phenyl, $x_1$, $x_2$ are integers from 1 to 500 with the proviso that the sum of $x_1+x_2$ is 7 to 1300, $y^1$ is 0 to 14 and $y^2$ is 1 to 13 with the proviso that the ratio of $$\frac{x_1+x_2}{y_1+2} \text{ or } \frac{x_1+x_2}{y_2+1}$$

is not greater than 70,

X is —$Z_1$—CO—NH—

$Z_1$ is oxygen, sulfur or $NR_5$, wherein $R_5$ is hydrogen or lower ($C_1$–$C_4$) alkyl, $Z_1$ is connected to $R_1$;

$Y_1$ is $$-R_8-Z_2-CO-\underset{R_3}{\overset{|}{C}}=\underset{R_6}{\overset{|}{CH}} \text{ or}$$

$$-O-R_7-O-CH_2=CH_2$$

wherein $R_6$ is: hydrogen, methyl, —COOR$_5$ or —COOR$_7$OH, $Z_2$=oxygen or —NR$_5$—

Y is the same as $Y_1$, or Y may also be H, alkyl of 1 to 8 carbon atoms, cyclohexyl, phenyl, o-tolyl, m-tolyl or p-tolyl, with the proviso that at least one of Y must have the same meaning as $Y_1$, $R_7$ is a linear or branched alkylene of 2 to 10 carbon atoms, phenylene or phenylalkylene with 2 to 10 carbon atoms in the alkylene, or polyoxyalkylene of structure G or $G_1$;

$R_8$ is an alkylene group of from 2 to 6 carbon atoms, $R_4$ is a diradical obtained by removing the NCO-groups from an aliphatic, cycloaliphatic, araliphatic or aromatic diisocyanate;

T is the group $$-X-R_1-\left(\underset{R_2}{\overset{R_a}{\underset{|}{\overset{|}{Si}O}}}\right)_{x1}\underset{R_e}{\overset{R_d}{\underset{|}{\overset{|}{Si}}}}-R_1-X-$$

$T_1$ is the group $$(R_2)_3-SiO\left(\underset{R_k}{\overset{R_g}{\underset{|}{\overset{|}{Si}O}}}\right)_{x1}\left[\underset{\underset{X}{|}}{\overset{R_h}{\underset{|}{\overset{|}{Si}O}}}\underset{\underset{X}{|}}{\overset{R_h}{\underset{|}{\overset{|}{Si}O}}}\left(\underset{R_j}{\overset{R_i}{\underset{|}{\overset{|}{Si}O}}}\right)_{x2}\right]Si(R_2)_3$$

n is 0 to 10, and (B) 95 to 25% by weight of said polymer of one or more mono-, di- or trifunctional vinyl monomer polymerizable by free radical polymerization.

6. A polymer according to claim 5, comprising the crosslinked copolymerization product of (A) from 15 to 60% by weight of said polymer of a linear or branched polysiloxane macromer defined in claim 5, and (B) 85 to 40% by weight of said polymer of a mixture of water-soluble and water-insoluble monomers or water-insoluble monomers, said monomers being monoolefinic, diolefinic or a mixture of monoolefinic and diolefinic monomers, with from 80 to 100% by weight of the total monomers being water-insoluble ($B_1$), with 100 to 0% by weight of total monomers being water-soluble ($B_2$), and 30 to 0% of the total monomers being diolefinic ($B_x$).

7. A polymer according to claim 5 wherein $R_1$ is alkylene of 3 or 4 carbon atoms, $R_2$, $R_a$, $R_b$, $R_c$, $R_d$, $R_e$, $R_f$, $R_g$, $R_h$, $R_i$, $R_j$ and $R_k$ are each methyl, $x_1+x_2$ is 10 to 100, $y_1$ is 0 to 2, $y_2$ is 1 to 3, $Z_1$ is —O— or —NH— and $R_4$ is a diradical of an aliphatic or cycloaliphatic diisocyanate with 6 to 10 carbon atoms, and Y is the same as $Y_1$, $R_6$ is hydrogen, $R_8$ is ethylene, and $Z_2$ is —O— or —NC(CH$_3$)$_3$—.

8. A polymer according to claim 7 where the polysiloxane is of structure $A_2$, $Z_1$ and $Z_2$ are each —O—, and $y_2$ is 1 or 2.

9. A polymer according to claim 5 wherein the polysiloxane is of structure $A_3$, or $A_4$, where $R_4$ is the diradical derived from isophorone diisocyanate.

10. A polymer according to claim 6 wherein monomer B is a water insoluble monomer $B_1$ which is an acrylate or methacrylate of formula CH$_2$=CR$_3$COOR$_{12}$, an acrylamide or methacrylamide of formula CH$_2$=CH$_3$CONHR$_{12}$, a maleate or fumarate of formula R$_{12}$OCOCH=CHCOOR$_{12}$, an itaconate of formula R$_{12}$OCOC(=CH$_2$)CH$_2$COOR$_{12}$, a vinyl ester of formula R$_{12}$COOCH=CH$_2$, a vinyl ether of formula CH$_2$=CHOR$_{12}$, or a mixture of said monomers, wherein $R_3$ is hydrogen or methyl, and $R_{12}$ is a linear or branched aliphatic, cycloaliphatic or aromatic alkyl group with from 1 to 21 carbon atoms and which may contain ether or thioether linkages or a —CO— group; or is a heterocyclic alkyl group containing oxygen, sulfur or nitrogen atoms, or a polypropylene oxide or poly-n-butylene oxide group with from 2 to 50 repeating alkoxy units; or is perfluorinated alkyl groups with from 1-12 carbon atoms; or is alkyl containing siloxane groups with from one to six Si atoms; or —SO— and —SO$_2$— groups.

11. A polymer according to claim 10 wherein the water insoluble monomer $B_1$ is selected from the group consisting of methyl methacrylate, isopropyl methacrylate, isobutyl methacrylate, tert-butyl methacrylate, isobornyl methacrylate, cyclohexyl methacrylate, hexafluoroisopropyl methacrylate and mixtures thereof.

12. A polymer according to claim 11 wherein the water insoluble monomer $B_1$ is selected from the group consisting of methyl methacrylate, cyclohexyl methacrylate, isobornyl methacrylate and mixtures thereof.

13. A polymer according to claim 6 wherein component (B) contains 1 to 30%, based on the total weight of monomer, of a diolefinic monomer ($B_x$).

14. A polymer according to claim 6 wherein diolefinic monomer ($B_x$) of component B is the acrylate or methacrylate of allyl alcohol, of a straight or branched chain alkylene glycol of 2 to 6 carbon atoms, of poly(ethylene oxide)glycol, of poly(propylene oxide)glycol, of poly(n-butylene oxide)glycol, of thiodiethylene glycol, of neopentylene glycol, of trimeth ylolpropane, or of pentaerthyritol; or the reaction product obtained by reacting one mol of a di- or tri-isocyanate of structure OCN—R$_4$—(NCO)$_v$, where $R_4$ is the radical derived by removing NCO groups from said isocyanate and v is 1 or 2, with 2 or 3 moles of a hydroxyalkyl acrylate or methacrylate.

15. A polymer according to claim 6 wherein component B is a mixture of methyl methacrylate and 1 to 25% by weight of the total monomer of neopentylene glycol diacrylate, ethylene glycol dimethacrylate or the reaction product of one mol of isophorone diisocyanate and two moles of 2-hydroxyethyl methacrylate.

16. A polymer according to claim 10 wherein the water insoluble monomer $B_1$ is a mixture of vinyl acetate and dimethyl maleate in a 2/1 to 5/1 mol ratio plus methyl methacrylate, isopropyl methacrylate, isobutyl methacrylate, tert-butyl methacrylate, cyclohexyl methacrylate or hexafluoroisopropyl methacrylate or mixtures thereof.

17. A polymer according to claim 10 wherein the water insoluble monomer $B_1$ is selected from the group consisting of 2-ethylhexyl acrylate, 2-ethylhexyl methacrylate, n-butyl acrylate, n-butyl methacrylate, n-octyl acrylate, n-octyl methacrylate, n-decyl acrylate, n-decyl methacrylate, perfluoroalkyl ($C_6$-$C_{10}$) substituted alkyl acrylate or methacrylate; and mixtures thereof.

18. A polymer according to claim 6 where in monomer B the water soluble monomer $B_2$ is an acrylate or methacrylate of formula CH$_2$=CR$_3$COOR$_{13}$, an acrylamide or methacrylamide of formula CH$_2$=CR$_3$CONHR$_{14}$ or CH$_2$=CH$_3$CON(R$_5$)$_2$, a maleate or fumarate of formula R$_{13}$OCOCH=CHCOOR$_{13}$, a vinyl ether of formula CH$_2$=CHOR$_{13}$, an N-vinyl lactam; or a mixture of said monomers, wherein $R_3$ is hydrogen or methyl, $R_5$ is hydrogen or lower ($C_1$-$C_4$) alkyl, $R_{13}$ is a hydrocarbon residue of 1 to 10 carbon atoms substituted by one or more water solubilizing groups such as carboxy, hydroxy or tert.-amino, or a polyethylene oxide group with from 2–100 repeating units, or a group which contains sulfate, phosphate, sulfonate or phosphonate groups, and $R_{14}$ is defined as $R_{13}$ or as $R_5$.

19. A polymer according to claim 18 wherein the water soluble monomer $B_2$ is selected from the group consisting of 2-hydroxyethyl methacrylate, N,N-dimethylacrylamide, acrylic acid, methacrylic acid and N-vinyl-2-pyrrolidone.

20. A polymer according to claim 6 where component A is a polysiloxane structure wherein $R_1$ is alkylene of 3 or 4 carbon atoms, $R_2$, $R_a$, $R_b$, $R_c$, $R_d$, $R_e$, $R_f$, $R_g$, $R_h$, $R_i$, $R_j$ and $R_k$ are each methyl, $x_1+x_2$ is 10 to 100, $y_1$ is 0 to 2, $y_2$ is 1 to 3, $Z_1$ is —O— or —NH— and $R_4$ is a diradical of an aliphatic or cycloaliphatic diisocyanate with 6 to 10 carbon atoms, and Y is the same as $Y_1$, $R_6$ is hydrogen, $R_8$ is ethylene, and $Z_2$ is —O— or —NC(CH$_3$)$_3$—, and component B contains from 0 to 30% based on total monomer of a diolefinic monomer ($B_x$) which is the acrylate or methacrylate of allyl alcohol, of a straight or branched chain alkylene glycol of 2 to 6 carbon atoms, of poly(ethylene oxide)glycol, of poly(propylene oxide)glycol, of poly(n-butylene oxide) glycol, of thiodiethylene glycol, of neopentylene glycol, of trimethylolpropane, or of pentaerthyritol; or the reaction product obtained by reacting one mol of a di- or tri-isocyanate of structure OCN—R$_4$—(NCO)$_v$, where $R_4$ is the radical derived by removing NCO groups from said isocyanate and v is 1 or 2, with 2 or 3 moles of a hydroxyalkyl acrylate or methacrylate.

21. A polymer according to claim 20 wherein $B_x$ is neopentylene glycol diacrylate, ethylene glycol dimethacrylate or the reaction product of one mol of isophorone diisocyanate and two moles of 2-hydroxyethyl methacrylate.

22. A polymer according to claim 20 wherein component B contains the water insoluble monomer $B_1$ selected from the group consisting of methyl methacrylate, isopropyl methacrylate, isobutyl methacrylate, tert-butyl methacrylate, isobornyl methacrylate, cyclohexyl methacrylate, hexafluoroisopropyl methacrylate and mixtures thereof.

23. A polymer according to claim 22 wherein component B contains the water insoluble monomer $B_1$ selected from the group consisting of methyl methacrylate, isopropyl methacrylate, isobutyl methacrylate, cyclohexyl methacrylate, isobornyl methacrylate and mixtures thereof.

24. A polymer according to claim 21 wherein component B contains as the water insoluble monomer $B_1$ methyl methacrylate, isobornyl methacrylate or mixtures thereof.

25. A polymer according to claim 20 wherein component B contains the water insoluble monomer $B_1$ which is a mixture of vinyl acetate and dimethyl maleate in a 2/1 to 5/1 mol ratio plus methyl methacrylate, isopropyl methacrylate, isobutyl methacrylate, tert-butyl methacrylate, cyclohexyl methacrylate or hexafluoroisopropyl methacrylate and mixtures thereof.

26. A polymer according to claim 20 wherein component B contains the water insoluble monomer $B_1$ selected from the group consisting of 2-ethylhexyl acrylate, n-butyl acrylate, n-butyl methacrylate, n-octyl acrylate, n-octyl methacrylate, n-decyl arylate, n-decyl methacrylate, perfluoroalkyl ($C_6$–$C_{10}$) substituted alkyl acrylate or methacrylate; and mixtures thereof.

27. A polymer according to claim 20 wherein component B contains the water soluble monomer $B_2$ selected from the group consisting of 2-hydroxyethyl methacrylate, N,N-dimethylacrylamide, acrylic acid, methacrylic acid and N-vinyl-2-pyrrolidone.

28. A polymer according to claim 20 which comprises
(A) from 15 to 40% by weight of a polysiloxane of structure $A_2$, $Z_1$ and $Z_2$ are each —O—, and $y_2$ is 1 or 2, and
(B) from 85 to 60% by weight of a mixture of a water-insoluble monomer ($B_1$), of a water-soluble monomer ($B_2$), and of a diolefinic monomer ($B_x$), wherein, based on percent by weight of the total weight of monomers,
$B_1$ is from 60 to 95% of a water-insoluble monomer selected from the group consisting of methyl methacrylate, isopropyl methacrylate, isobutyl methacrylate, tert-butyl methacrylate, cyclohexyl methacrylate, isobornyl methacrylate and mixtures thereof,
$B_2$ is from 20 to 0% of a water-soluble monomer selected from the group consisting of 2-hydroxyethyl methacrylate, N,N-dimethylacrylamide, acrylic acid, methacrylic acid, N-vinyl-2-pyrrolidone and mixtures thereof, and
$B_x$ is from 30 to 5% of a diolefinic monomer selected from the group consisting of neopentylene glycol diacrylate, ethylene glycol dimethacrylate and the reaction product of one mol of isophorone diisocyanate and two moles of 2-hydroxyethyl methacrylate.

29. A polymer according to claim 20 which comprises
(A) from 40 to 60% by weight of a polysiloxane of structure $A_2$, $Z_1$ and $Z_2$ are each —O—, and $y_2$ is 1 or 2, and
(B) from 60 to 40% by weight of a mixture of a water-insoluble monomer ($B_1$), of a water-soluble monomer ($B_2$), and of a diolefinic monomer ($B_x$), wherein, based on percent by weight of the total weight of monomers,
$B_1$ is from 75 to 100% of a water-insoluble monomer selected from the group consisting of ethyl acrylate or methacrylate, n-butyl acrylate or methacrylate, n-hexyl acrylate or methacrylate, 2-ethylhexyl acrylate or methacrylate, n-octyl acrylate or methacrylate, n-decyl acrylate or methacrylate and mixtures thereof and with mixtures thereof with methyl or isobornyl methacrylate,
$B_2$ is from 25 to 0% of a water-soluble monomer selected from the group consisting of 2-hydroxyethyl methacrylate, N,N-dimethylacrylamide, acrylic acid, methacrylic acid, N-vinyl-2-pyrrolidone and mixtures thereof, and
$B_x$ is from 5 to 0% of a diolefinic monomer selected from the group consisting of neopentylene glycol diacrylate, ethylene glycol dimethacrylate and the reaction product of one mol of isophorone diisocyanate and two moles of 2-hydroxyethyl methacrylate.

30. A polymer according to claim 20 which comprises
(A) from 20 to 60% by weight of a polysiloxane of structure $A_2$, $Z_1$ and $Z_2$ are each —O—, and $y_2$ is 1 or 2, and
(B) from 80 to 40% by weight of a mixture of a water-insoluble monomer ($B_1$), of a water-soluble monomer ($B_2$), and of a diolefinic monomer ($B_x$), wherein, based on percent by weight of the total weight of monomers,
$B_1$ is from 0 to 80% of a water-insoluble monomer selected from the group consisting of methyl methacrylate, 2-ethylhexyl acrylate, hexafluoroisopropyl methacrylate, perfluoroalkyl ($C_6$–$C_{10}$) acrylate or methacrylate, isopropyl methacrylate, isobutyl methacrylate, tert-butyl methacrylate, cyclohexyl methacrylate, isobornyl methacrylate and mixtures thereof,
$B_2$ is from 100 to 20% of a water-soluble monomer selected from the group consisting of 2-hydroxyethyl methacrylate, N,N-dimethylacrylamide, N-vinyl-2-pyrrolidone acrylamide and mixtures thereof, and
$B_x$ is from 0 to 5% of a diolefinic monomer selected from the group consisting of neopentylene glycol diacrylate, ethylene glycol dimethacrylate and the reaction product of one mol of isophorone diisocyanate and two moles of 2-hydroxyethyl methacrylate.

31. A hard contact lens prepared from the polymer according to claim 5.

32. A hard contact lens prepared from the polymer according to claim 28.

33. A soft contact lens prepared from the polymer according to claim 5.

34. A soft contact lens prepared from the polymer according to claim 29.

35. A soft hydrogel contact lens prepared from the polymer according to claim 5.

36. A soft hydrogel contact lens prepared from the polymer according to claim 30.

37. A polymer according to claim 20 which comprises (A) from 15 to 40% by weight of a polysiloxane of structure $A_1$, $Z_1$ and $Z_2$ are each —O—, and $y_1$ is 0 and (B) from 85 to 60% by weight of a mixture of a water-insoluble momomer ($B_1$), of a water-soluble monomer ($B_2$), and of a diolefinic monomer ($B_x$), wherein, based on percent by weight of the total weight of monomers, $B_1$ is from 60 to 95% of a water-insoluble monomer selected from the group consisting of methyl methacrylate, isopropyl methacrylate, isobutyl methacrylate, tert-butyl methacrylate, cyclohexyl methacrylate, isobornyl methacrylate and mixtures thereof, $B_2$ is from 20 to 0% of a water-soluble monomer selected from the group consisting of 2-hydroxyethyl methacrylate, N,N-dimethylacrylamide, acrylic acid, methacrylic acid, N-vinyl-2-pyrrolidone and mixtures thereof, and $B_x$ is from 30 to 5% of a dioelfinic monomer selected from the group consisting of neopentylene glycol diacrylate, ethylene glycol dimethacrylate and the reaction product of one mol of isophorone diisocyanate and two moles of 2-hydroxyethyl methacrylate.

38. A polymer according to claim 20 which comrpises (A) from 40 to 60% by weight of a polysiloxane of structure $A_3$, $Z_1$ and $Z_2$ are each —O—, and $y_1$ is 0 and (B) from 60 to 40% by weight of a mixture of a water-insoluble monomer ($B_1$), of a water-soluble monomer ($B_2$), and of a diolefinic monomer ($B_x$), wherein, based on percent by weight of the total weight of monomers, $B_1$ is from 75 to 100% of a water-insoluble monomer selected from the group consisting of ethyl acrylate or methacrylate, n-butyl acrylate or methacrylate, n-hexyl acrylate or methacrylate, 2-ethylhexyl acylate or methacrylate, n-octyl acrylate or methacrylate, n-decyl acrylate or methacrylate and mixtures thereof and with mixtures thereof with methyl or isoborynyl methacrylate, $B_2$ is from 25 to 0% of a water-soluble monomer selected from the group consisting of 2-hydroxyethyl methacrylate, N,N-dimethylacrylamide, acrylic acid, methacrylic acid, N-vinyl-2-pyrrolidone and mixtures thereof, and $B_x$ is from 5 to 0% of a diolefinic monomer selected from the group consisting of neopentylene glycol diacrylate, ethylene glycol dimethacrylate and the reaction product of one mol of isophorone diisocyanate and two moles of 2-hydroxyethyl methacrylate.

39. A polymer according to claim 20 which comprises (A) from 20 to 60% by weight of a polysiloxane of structure $A_3$, $Z_1$ and $Z_2$ are each —O—, and $y_1$ is 0, and (B) from 80 to 40% by weight of a mixture of a water-insoluble monomer ($B_1$), of a water-soluble monomer ($B_2$), and of a diolefinic monomer ($B_x$), wherein, based on percent by weight of the total weight of monomers, $B_1$ is from 0 to 80% of a water-insoluble monomer selected from the group consisting of methyl methacrylate, 2-ethylhexyl acrylate, hexafluoroisopropyl methacrylate, perfluoroalkyl ($C_6$–$C_{10}$) acrylate or methacrylate, isopropyl methacrylate, isobutyl methacrylate, tert-butyl methacrylate, cyclohexyl methacrylate, isobornyl methacrylate and mixtures thereof, $B_2$ is from 100 to 20% of a water-soluble monomer selected from the group consisting of 2-hydroxyethyl methacrylate, N,N-dimethylacrylamide, N-vinyl-2-pyrrolidone, acrylamide and mixtures thereof, and $B_x$ is from 0 to 5% of a diolefinic monomer selected from the group consisting of neopentylene glycol diacrylate, ethylene glycol dimethacrylate and the reaction product of one mol of isophorone diisocyanate and two moles of 2-hydroxyethyl methacrylate.

40. A polysiloxane macromer according to claim 2 where the polysiloxane is of structure $A_1$, $Z_1$, and $Z_2$ are each —O— and $y_1$ is 0.

* * * * *